(12) United States Patent
Rank

(10) Patent No.: US 6,494,463 B1
(45) Date of Patent: Dec. 17, 2002

(54) PLUG FOR SEALING MORE THAN ONE SIZE OF HOLE

(76) Inventor: Kurt J. Rank, 3812 Consolvo Dr., Flower Mound, TX (US) 75022

(*) Notice: Subject to any disclaimer, the term of this patent is extended or adjusted under 35 U.S.C. 154(b) by 4 days.

(21) Appl. No.: 09/707,640

(22) Filed: Nov. 6, 2000

(51) Int. Cl.⁷ ............................. F16L 17/03; F16L 55/11
(52) U.S. Cl. ...................... 277/607; 277/615; 277/626; 277/627; 277/648; 138/89
(58) Field of Search ................................. 277/604, 607, 277/615, 626, 644, 648; 138/89

(56) References Cited

U.S. PATENT DOCUMENTS

| | | | |
|---|---|---|---|
| 220,773 A | | 10/1879 | Stewart |
| 2,196,785 A | | 4/1940 | Takiguchi ..................... 215/47 |
| 2,577,780 A | * | 12/1951 | Lockhart |
| 2,615,740 A | * | 10/1952 | Nathan |
| 3,213,584 A | * | 10/1965 | Bush |
| 3,272,059 A | * | 9/1966 | Lyday et al. |
| 3,274,747 A | * | 9/1966 | Rueslein et al. |
| 3,352,212 A | * | 11/1967 | Read |
| 3,358,869 A | * | 12/1967 | Palmer et al. |
| 3,558,144 A | * | 1/1971 | Corbett et al. |
| 3,578,027 A | * | 5/1971 | Zopfi |
| 3,857,589 A | * | 12/1974 | Oostenbrink |
| 4,823,411 A | * | 4/1989 | Nettel |
| 4,984,831 A | * | 1/1991 | Bentsson |
| 5,248,154 A | * | 9/1993 | Westhoff et al. |
| 5,324,083 A | * | 6/1994 | Vogelsang |
| 5,327,942 A | | 7/1994 | Black .......................... 138/89 |
| 5,351,973 A | * | 10/1994 | Taniuchi et al. |
| 5,496,141 A | * | 3/1996 | Popsys |
| 5,497,807 A | * | 3/1996 | Rogers |
| 5,720,487 A | * | 2/1998 | Kato |
| 5,954,345 A | * | 9/1999 | Svoboda et al. |
| 6,036,541 A | * | 3/2000 | Koumatsu |
| 6,102,410 A | * | 8/2000 | Hotta |
| 6,343,412 B1 | * | 2/2002 | Stephenson |

FOREIGN PATENT DOCUMENTS

| | | | |
|---|---|---|---|
| DE | 3915268 | * | 12/1990 |
| FR | 1201761 | | 7/1959 |
| GB | 914647 | | 11/1959 |
| IT | 536228 | | 11/1955 |

* cited by examiner

*Primary Examiner*—Anthony Knight
*Assistant Examiner*—Alison K. Pickard
(74) *Attorney, Agent, or Firm*—Donald J. Ersler

(57) ABSTRACT

A plug for sealing holes includes a body and at least three sealing ribs. The body is preferably hollow to save material and molding cycle time. A thickened area is formed at a rear of the body such that a screw driver may be used to insert the plug into a hole. The first sealing rib is formed at substantially a front of the body such that a lead-in area is formed on the body to facilitate easy insertion of the plug into a hole. The distance between each sealing rib is at least twice the greatest thickness of a single sealing rib.

4 Claims, 2 Drawing Sheets

PLUG FOR SEALING MORE THAN ONE SIZE OF HOLE

BACKGROUND OF THE INVENTION

1. Field of the Invention

The present invention relates generally to plugs and more specifically to a single plug which may be used to seal more than one size of hole.

2. Discussion of the Prior Art

Currently, there are numerous plugs available for sealing openings. There are at least two patents which disclose plugs that could be used for sealing a hole drilled in a building for spraying an insecticide. English Patent No. 914,647 to Hunt discloses a plug for sealing a bore-hole. U.S. Pat. No. 5,327,942 to Black discloses a sealing plug for apertures.

Accordingly, there is a clearly felt need in the art for a a single size of plug which may be used to seal more than one size of hole, has multiple sealing ridges, has a lead-in area in a front, and a thickened area at a rear.

SUMMARY OF THE INVENTION

The present invention provides a plug for sealing more than one size of hole which has numerous advantages over prior art plugs. The plug for sealing holes includes a body and at least three sealing ribs. The body is preferably hollow to save material and molding cycle time. A thickened area is formed at a rear of the body such that a screw driver may be used to insert the plug into a hole. The first sealing rib is formed at substantially a front of the body such that a lead-in area is formed on the body to facilitate easy insertion of the plug into a hole. The distance between each sealing rib is at least as thick as the greatest thickness of each sealing rib. The plug for sealing holes is preferably fabricated from a polyethylene plastic or other suitable material. The plug for sealing holes is rigid enough to seal a hole while being flexible enough to accommodate a variation in hole size of at least 20%.

Accordingly, it is an object of the present invention to provide a plug for sealing holes which may be used to seal more than one size of hole.

It is a further object of the present invention to provide a plug for sealing holes which may has a lead-in area for easy insertion into a hole.

Finally, it is another object of the present invention to provide a plug for sealing holes which may be inserted into a hole utilizing a blade end of a screw driver.

These and additional objects, advantages, features and benefits of the present invention will become apparent from the following specification.

DETAILED DESCRIPTION OF THE PREFERRED EMBODIMENTS

Figure 1:
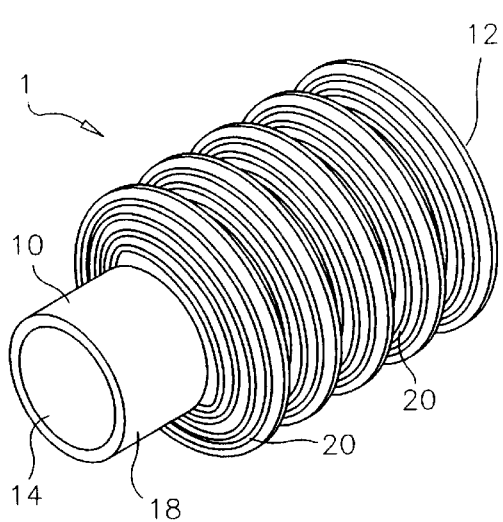
FIG. 1 is a perspective view of a plug for sealing holes in accordance with the present invention.

With reference now to the drawings, and particularly to FIG. 1, there is shown a perspective view of a plug for sealing holes 1. With reference to FIGS. 2–5, the plug for sealing holes 1 includes a body 10 and at least three sealing ribs 12. A bore 14 is formed through substantially the length of the body 10 to save material and molding cycle time. A thickened area 16 is formed at a rear of the body 10 such that a screw driver may be used to insert the plug for sealing holes 1 into a bore. The thickened area 16 is thick enough such that a blade end of the screw driver will not break through to the bore 14. The width of the thickened area 16 is greater than the wall thickness between an outside of the body 10 and the bore 14.

Figure 7:
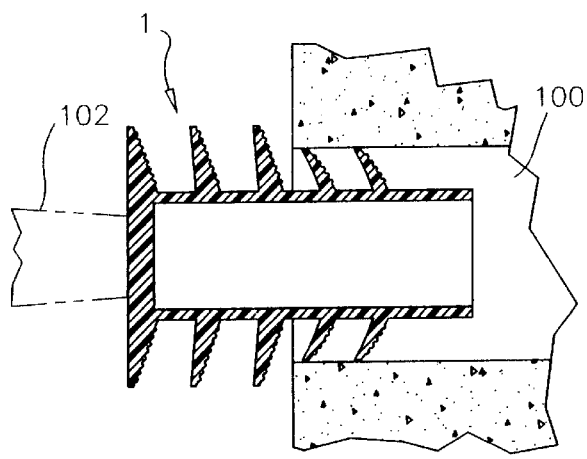
FIG. 7 is a cross sectional view of a plug for sealing holes partially inserted into a bore in accordance with the present invention.

The first sealing rib 12 is formed at substantially a front of the body such that a lead-in area 18 is formed to facilitate easy insertion of the plug for sealing holes 1 into a bore. The length of the lead-in area is at least as long as the distance between two sealing ribs 12. The distance between each sealing rib 12 is at least as thick as the greatest thickness of each sealing rib 12. The distance between each sealing rib allows each sealing rib 12 to have greater flexibility when inserted into a bore 100 and deformed as shown in FIG. 7.

Figure 6:
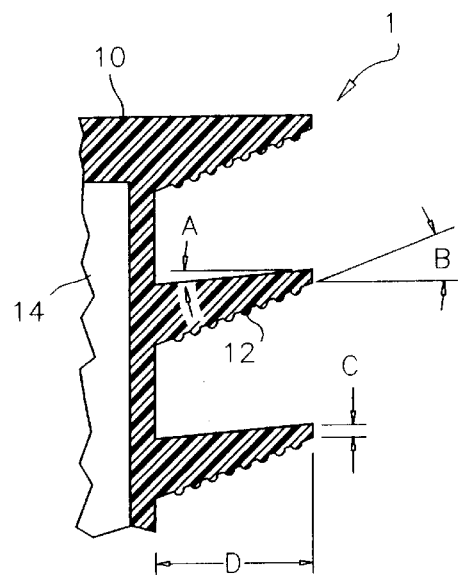
FIG. 6 is an enlarged area of three sealing ribs in accordance with the present invention.

With reference to FIG. 6, the sealing rib 12 includes a front surface defined by an angle B and, an outer perimeter with a thickness of dimension C, and a length of dimension D. Angle B originates at an outer perimeter of the body 10 and slopes back toward a rear of the body 10. The sealing rib 12 preferably has a rear surface defined by an angle A. Angle B preferably has a value between 10–25 degrees. The angle A preferably has a value between 0–10 degrees. Dimension C may have a value of zero defining a junction between a front and rear of the sealing rib 12, or a small flat surface with a preferable range between 0.005–0.015 inches separating the front and rear of the sealing rib 12. The length of dimension D preferably has a value of at least 35 percent of the outer diameter of the body 10. The angle B facilitates insertion of the plug for sealing holes 1 by acting as a chamfered or beveled surface.

Figure 8:
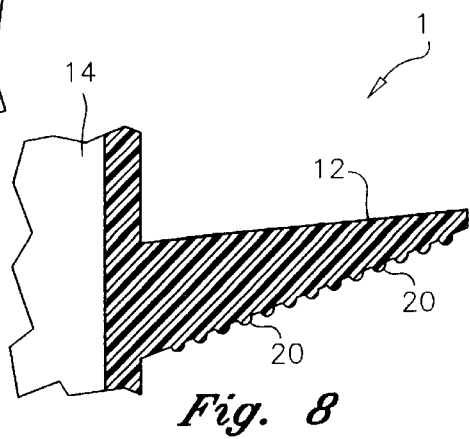
FIG. 8 is an enlarged cross sectional view of a plurality of circumferential ridges formed on a front of a sealing rib in accordance with the present invention.
Figure 2:
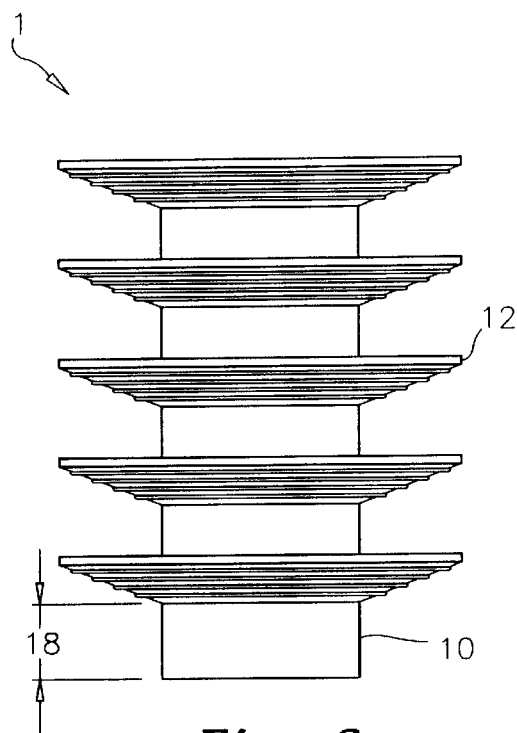
FIG. 2 is a side view of a plug for sealing holes in accordance with the present invention.
Figure 3:
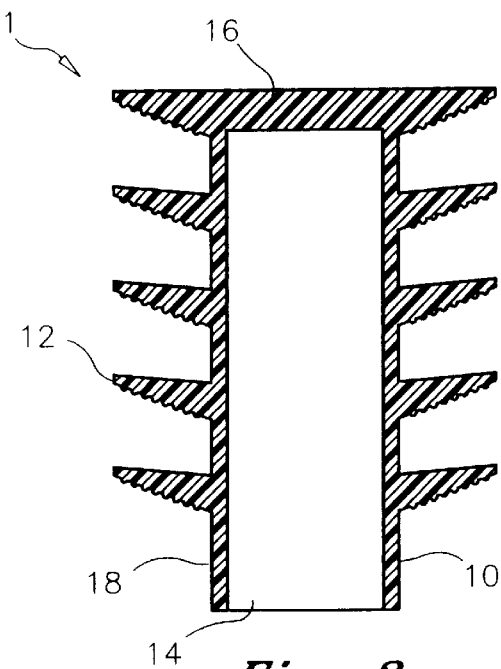
FIG. 3 is a cross sectional view of a plug for sealing holes in accordance with the present invention.
Figure 4:
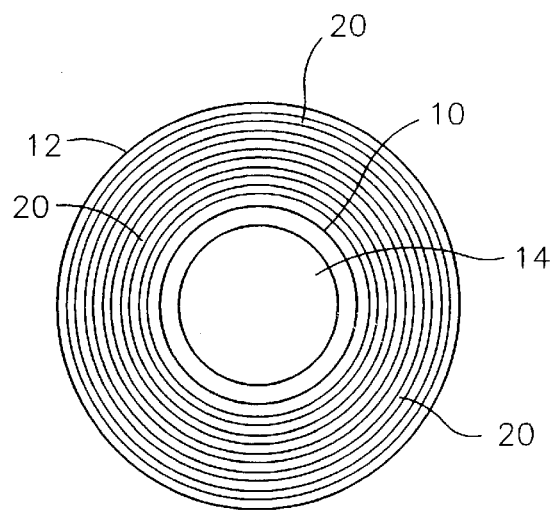
FIG. 4 is a front end view of a plug for sealing holes in accordance with the present invention.
Figure 5:
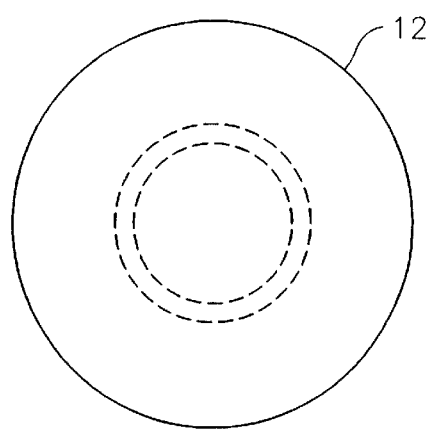
FIG. 5 is a rear end view of a plug for sealing holes in accordance with the present invention.

FIG. 8 shows an enlarged cross sectional view of a sealing rib 12. Satisfactory operation of the plug for sealing holes 1 has been found to occur when a plurality of circumferential ridges 20 are formed on a front of each sealing rib 12. However, sealing may be accomplished without the inclusion of the circumferential ridges 20.

The following dimensions are given by way of example and not by way of limitation. An example of a plug for sealing holes 1 which has been found to work satisfactorily for holes with a dimensional range between ½–⅝ inches, has the following dimensions. Angle B is 20 degrees; the outside diameter of the at least three sealing ribs 12 is 0.660 inches; the outside diameter of the body 10 is 0.350 inches; and the bore 14 is 0.250 inches.

The plug for sealing holes 1 is preferably fabricated from a polyethylene plastic, but may fabricated from other suitable materials. The plug for sealing holes is rigid enough to seal a hole while being flexible enough to accommodate a variation in hole size of at least 20%. The plug for sealing holes 1 should not be limited to sealing holes drilled in building materials for the insertion of insecticide spraying nozzles, but could include any suitable application.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A plug for sealing a hole comprising:

a body having a front and rear, a bore originating at said front and being formed through substantially the length of said body, a thickened area being formed at said rear of said body, said thickened area being thick enough such that a blade end of a screw driver will not break through to said bore during insertion of said plug for sealing a hole;

at least three sealing ribs being formed around the periphery of said body, a first sealing rib of said at least three ribs being formed on substantially said front of said body such that a lead-in area is formed on said body, a plurality of circumferential ridges being formed on a front surface of said sealing ribs, a radial length of each said rib from an inner diameter to an outer diameter thereof being at least 35% of the outer diameter of said plug for sealing a hole; and said plug for sealing a hole being fabricated from material that is flexible enough to allow a single size of said plug for sealing a hole to seal a variation in hole size of at least 20 percent.

2. The plug for sealing a hole of claim 1 wherein:

a distance between each said sealing rib being at least as thick as the greatest thickness of each said sealing rib.

3. The plug for sealing a hole of claim 1 wherein:

a front surface of each said sealing rib having an angle originating at an outer diameter of said plug for sealing a hole, which slopes toward said front of said body.

4. The plug for sealing a hole of claim 1 wherein:

a rear surface of each said sealing rib having an angle originating at an outer diameter of said plug for sealing a hole, which slopes toward said front of said body.

* * * * *